May 1, 1923.
W. C. HEDGCOCK
ADJUSTABLE BRAKE HEAD
Filed Aug. 8, 1921
1,453,838
2 Sheets-Sheet 1
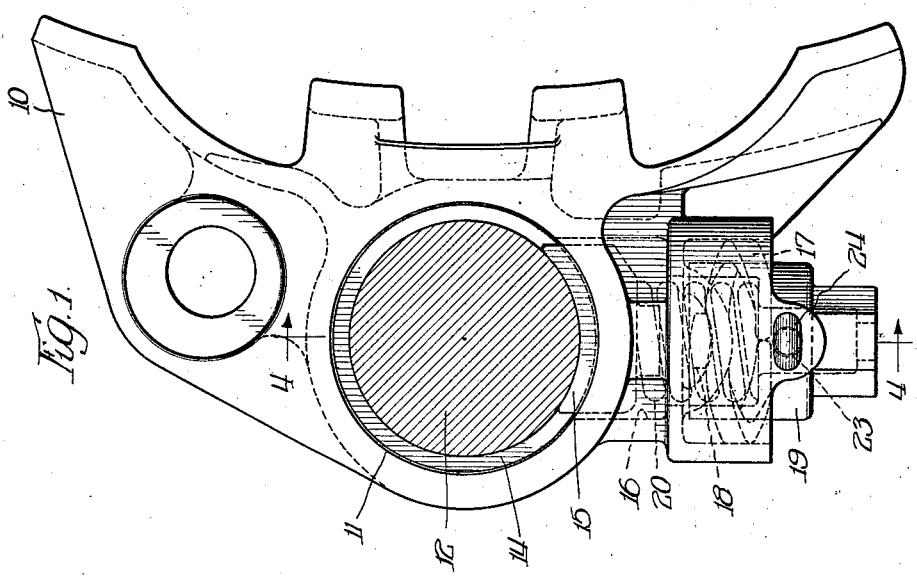
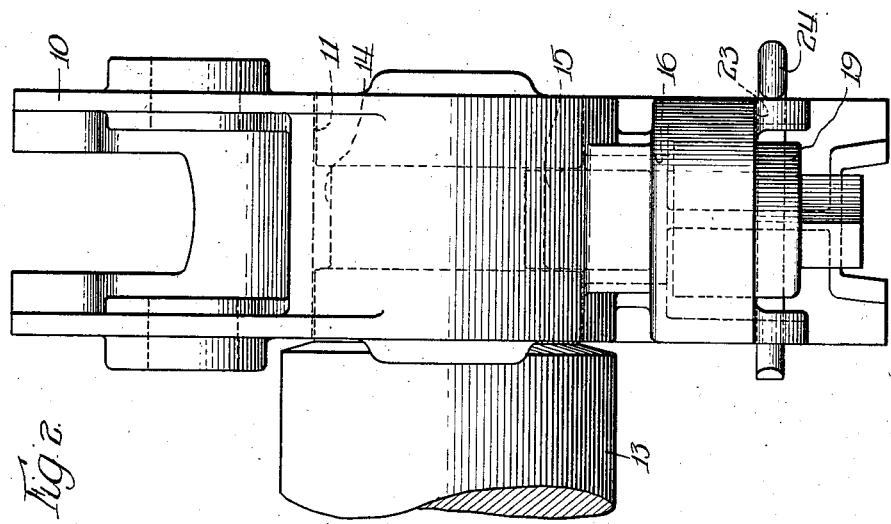
Witness:
R. Burkhardt
Inventor:
William C. Hedgcock,
By Wilkinson, Huxley, Byron & Knight
Attys.

May 1, 1923.
W. C. HEDGCOCK
1,453,838
ADJUSTABLE BRAKE HEAD
Filed Aug. 8, 1921
2 Sheets-Sheet 2
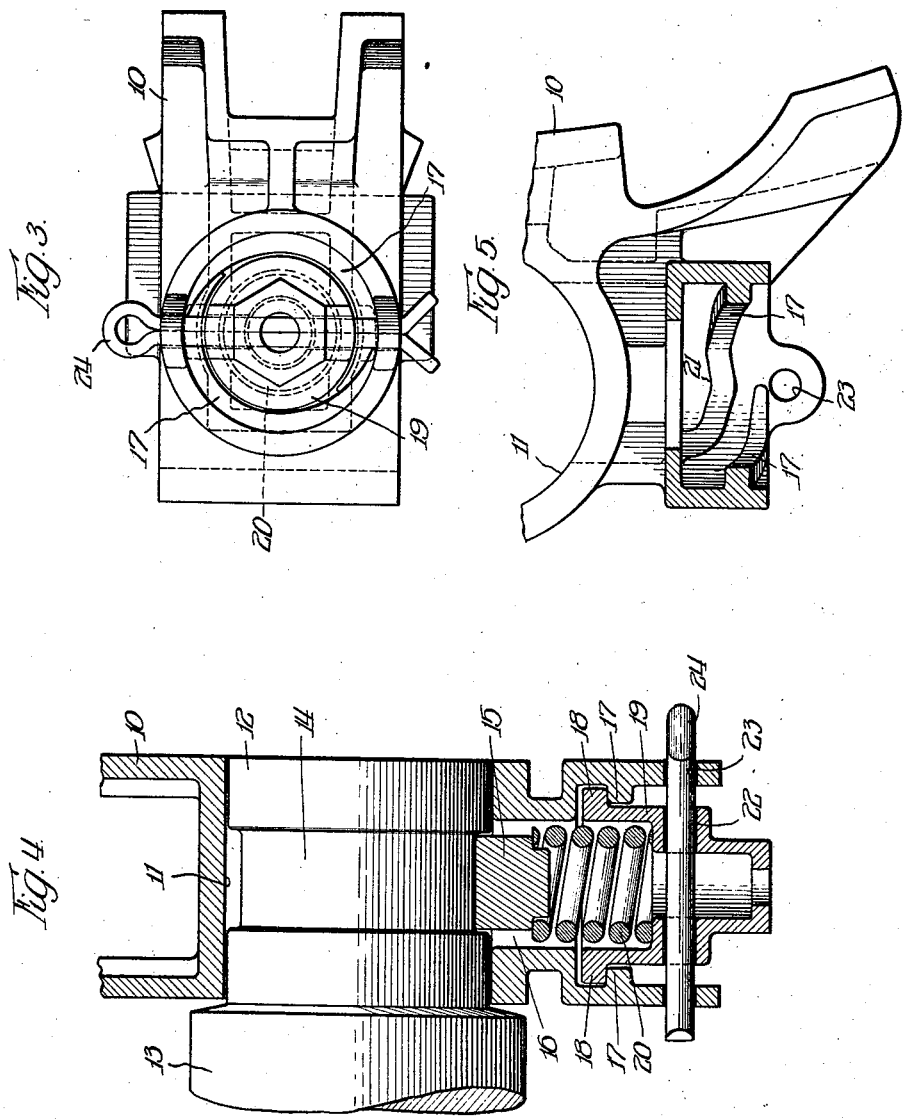
Witness:
R. Burkhardt
Inventor:
William C. Hedgcock,
By Wilkinson, Huxley, Byron & Knight
Attys.

Patented May 1, 1923.

1,453,838

UNITED STATES PATENT OFFICE.

WILLIAM C. HEDGCOCK, OF CHICAGO, ILLINOIS, ASSIGNOR TO AMERICAN STEEL FOUNDRIES, OF CHICAGO, ILLINOIS, A CORPORATION OF NEW JERSEY.

ADJUSTABLE BRAKE HEAD.

Application filed August 8, 1921. Serial No. 490,503.

*To all whom it may concern:*

Be it known that I, WILLIAM C. HEDGCOCK, a citizen of the United States, residing at Chicago, in the county of Cook and State of Illinois, have invented certain new and useful Improvements in Adjustable Brake Heads, of which the following is a specification.

This invention relates to adjustable brake heads.

One object of the invention is to provide a simple, efficient and durable adjustable brake head having improved means for permitting the necessary adjustment while at the same time offering frictional resistance to prevent such adjustment when it is not desired.

Another object is to provide an improved adjustable brake head which permits of easy assembling and disassembling of the locking parts and of the brake head with respect to the brake beam.

The invention is illustrated on the accompanying sheets of drawings in which—

Figure 1 is a side elevation of a brake head embodying my invention and showing in section the trunnion end of an associated brake beam;

Figure 2 is a rear elevation of the same;

Figure 3 is a bottom plan view of the same brake head;

Figure 4 is a sectional view taken in the plane of line 4—4 of Figure 1; and

Figure 5 is a fragmentary detail side elevation of the brake head showing the spring pocket in section.

The various novel features of the invention will be apparent from the following description and drawings and will be particularly pointed out in the appended claims.

Referring to the figures of the drawings it will be noted that I have provided a brake head 10 having the usual central opening 11 for the reception of a trunnion 12 of a brake beam 13. The brake beam trunnion is provided with a circumferential groove 14 for the reception of a combination frictional bearing and locking block 15 which when retained in operative position, as shown, not only yieldably holds the brake head in adjusted position circumferentially of the trunnion but also prevents the brake head from being accidentally removed endwise of the brake beam. The brake head in its lower portion is provided with a spring pocket or opening 16 which also receives the block 15. The lower end of the spring opening 16 is provided with a plurality of oppositely arranged helically formed portions 17. Co-operating with these helically formed portions 17 are lugs 18 projecting outwardly from a spring cap 19 which receive the coiled spring 20 which in turn yieldably presses the block 15 into engagement with the grooved portion 14 of the brake beam trunnion.

In assembling the parts, block 15 is inserted into the opening 16 of the brake head either through the top thereof or in cases where the lower opening is made sufficiently large, through the bottom thereof, whereupon the brake head is placed upon the trunnion, it being understood that the block 15 drops down into the opening 16 sufficiently to permit easy application of the brake head on the trunnion. The spring 20 is then applied through the lower end of the opening 16 with the spring cap 19, it being understood that the lugs 18 of the spring cap ride over the oppositely arranged helically formed portions 17 as the spring cap is rotated to place the spring 20 under proper compression to yieldably press the block 15 against the grooved portion 14 of the trunnion.

Referring particularly to Figure 5 of the drawings, it will be noted that the helically formed portions 17 are provided with depressions or notches 21 whereby when the cap 19 has been advanced to the proper position for its lugs 18 to engage the depressions 21 the cap will be prevented from accidentally backing down from its proper supporting position. Also for this same purpose the spring cap 19 and lower end of the brake head are provided with registered openings 22 and 23 for the reception of a key 24.

By means of this combination a relatively small number of simple parts cooperate to frictionally hold the brake head in adjusted position in a manner to meet operating requirements and also provide for the easy assembling and disassembling of the locking parts and of the brake head with respect to the brake beam.

It is my intention to cover all modifications of the invention falling within the spirit and scope of the following claims.

I claim:

1. In brake mechanism, the combination of a brake head with a spring opening having walls with oppositely arranged helically formed portions with depressions therein, and a spring cap having lugs cooperating with said helically formed portions and depressions for operatively retaining said brake head on an associated support.

2. In brake mechanism, the combination of a brake head having an opening, the walls of which are provided with helically formed portions, a block for frictionally engaging an associated brake beam trunnion, a spring cooperating with said block, means having lugs cooperating with said helically formed portions for compressing said spring and forcing said block into operative association with the brake beam trunnion, said helically formed portions having depressions whereby said means is prevented from accidentally moving into an inoperative position.

3. In brake mechanism, the combination of a brake head having an opening, the walls of which are provided with helically formed portions, a block for frictionally engaging an associated brake beam trunnion, a spring cooperating with said block, means having lugs cooperating with said helically formed portions for compressing said spring and forcing said block into operative association with the brake beam trunnion, said helically formed portions having depressions whereby said means is prevented from accidentally moving into an inoperative position, and additional means for locking said aforesaid means in operative position.

Signed at Chicago, Illinois, this 2nd day of August, 1921.

WILLIAM C. HEDGCOCK.